United States Patent
Groover et al.

(10) Patent No.: US 9,557,984 B2
(45) Date of Patent: Jan. 31, 2017

(54) PERFORMING CODE LOAD OPERATIONS ON MANAGED COMPONENTS IN A SYSTEM

(71) Applicant: INTERNATIONAL BUSINESS MACHINES CORPORATION, Armonk, NY (US)

(72) Inventors: Michael P. Groover, Vail, AZ (US); Robin Han, Lincoln, CA (US); Cindy K. Hoac, San Jose, CA (US); Ronald D. Martens, Benson, AZ (US); Tony J. Zhang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/659,491

(22) Filed: Mar. 16, 2015

(65) Prior Publication Data
US 2016/0274886 A1 Sep. 22, 2016

(51) Int. Cl.
*G06F 9/445* (2006.01)

(52) U.S. Cl.
CPC ............. *G06F 8/65* (2013.01); *G06F 9/44578* (2013.01)

(58) Field of Classification Search
CPC ................................ G06F 8/65; G06F 9/44578
(Continued)

(56) References Cited

U.S. PATENT DOCUMENTS

2002/0078437 A1* 6/2002 Grassman ................ G06F 8/67
717/168

2006/0271254 A1 11/2006 Shah et al.
(Continued)

FOREIGN PATENT DOCUMENTS

CN 102968357 3/2013
EP 2916228 9/2015
(Continued)

OTHER PUBLICATIONS

He, et al; "The Revenge of the Overlay: Automatic Compaction of OS Kernel Code via On-Demand Code Loading", Proceedings of the 7th ACM & IEEE International Conference on Embedded Software, ACM, 2007, pp. 75-83.
(Continued)

*Primary Examiner* — Li B. Zhen
*Assistant Examiner* — Daniel Wei
(74) *Attorney, Agent, or Firm* — David W. Victor; Konrad Raynes Davda & Victor LLP (57) ABSTRACT

Provided are a computer program product, system, and method for performing code load operations on managed components in a system. A first node group comprising at least one computational node in the computer system performs code load operations for the managed components. Status of the code load operations at the managed component is written to a status data structure while the code load operations are being performed at the managed component. The first node group transfers control of the code load operations for the managed components to a second node group comprising at least computational node in the computer system while the code load operations are occurring at the managed components. A second node group reads the status data structure for the managed components to determine the status of the code load operations and continue the code load operations at managed components.

23 Claims, 5 Drawing Sheets

(58) Field of Classification Search
USPC .......................................................... 717/168
See application file for complete search history.

(56) References Cited

U.S. PATENT DOCUMENTS

| | | | |
|---|---|---|---|
| 2006/0282831 A1* | 12/2006 | Toeroe | G06F 8/65 717/168 |
| 2007/0162708 A1 | 7/2007 | Wang | |
| 2008/0155333 A1 | 6/2008 | Brundige et al. | |
| 2009/0240791 A1* | 9/2009 | Sakurai | G06F 8/65 709/221 |
| 2009/0319699 A1* | 12/2009 | Canto | G06F 11/2089 710/17 |
| 2012/0297115 A1 | 11/2012 | Liang | |
| 2014/0379919 A1 | 12/2014 | Groover et al. | |

FOREIGN PATENT DOCUMENTS

| | | |
|---|---|---|
| WO | 9931955 | 7/1999 |
| WO | 2007081660 | 7/2007 |
| WO | 2009156404 | 12/2009 |

OTHER PUBLICATIONS de Bruijn, et al; "Model-T: Rethinking the OS for Terabit Speeds", NFOCOM Workshops, IEEE, 2008, pp. 1-6.

Macapuna, et al., "In-Packet Bloom Filter Based Data Center Networking with Distributed Openflow Controllers", In GLOBECOM Workshops (GC Wkshps), IEEE, 2010, pp. 584-588.

"IBM_BladeCenter_S_RAID_SAS_Switch_Module_Firmware", Version 1.3.3.006, Build ID: S0CL133006 Update via Windows, [online] [retrieved online Feb. 16, 2015], http://delivery04.dhe.ibm.com/sar/CMA/XSA/050km/0/ibm_fw_bcsw_s0 . . ., Feb. 2015, pp. 5.

European Search Report dated 082616, pp. 8, for Application No. 16159948.5, filed Mar. 11, 2016.

CN102968357_English_Translation.

EP2916228 is the English language counterpart of CN102968357.

\* cited by examiner

Status Information

PERFORMING CODE LOAD OPERATIONS ON MANAGED COMPONENTS IN A SYSTEM

BACKGROUND OF THE INVENTION

1. Field of the Invention

The present invention relates to a computer program product, system, and method for performing code load operations on managed components in a system.

2. Description of the Related Art

In complex systems having numerous components, such as enterprise storage servers, the code load operations must be performed to update the code level at the different components. The code update operation, such as a firmware upgrade, takes that component offline and may disrupt the system operations. Such disruptions can be problematic for enterprise storage systems that require high availability. Further, expanding system components requiring code update operations can impact code load performance.

There is a need in the art for improved techniques for performing code load operations on managed components in a system.

SUMMARY

Provided are a computer program product, system, and method for performing code load operations on managed components in a system. A first node group comprising at least one computational node in the computer system performs code load operations for the managed components. Status of the code load operations at the managed component is written to a status data structure while the code load operations are being performed at the managed component. The first node group transfers control of the code load operations for the managed components to a second node group comprising at least computational node in the computer system while the code load operations are occurring at the managed components. A second node group reads the status data structure for the managed components to determine the status of the code load operations and continue the code load operations at managed components.

DETAILED DESCRIPTION

Described embodiments provide techniques for performing code load operations in a system having numerous managed components to allow system operations to continue while the nodes are undergoing code upgrades. With described embodiments, a first node group of at least one computational node handles code load operations and regular system operations. The first node group may perform code load operations with respect to a first instance of managed components part of a redundancy group, while a second instance of the managed components are available to support system operations so the system remains available during the code load. If the first node group needs to stop handling code load operations, then the code load operations are transferred to a second node group to continue with code load operations at the point where the first node group ceased code load operations.

Certain described embodiments provide multiple node groups of computational nodes to perform code load operations. A node group can take over code load operations for another node group when that node group's computational components need to be taken off-line, such as to go through their own code update process. Described embodiments provide a management console comprising a common communication platform accessible to all the node groups and that maintains the code load status information for the managed components. This allows the node group taking over the code load operations to access the status information to continue the code load operations from where the first node group left off. Further, with described embodiments, adding managed components to the system will not increase code load complexity or duration because the code load operations are performed by a separate node group that also takes over the system operations for the managed components undergoing code load operations.

Figure 1:
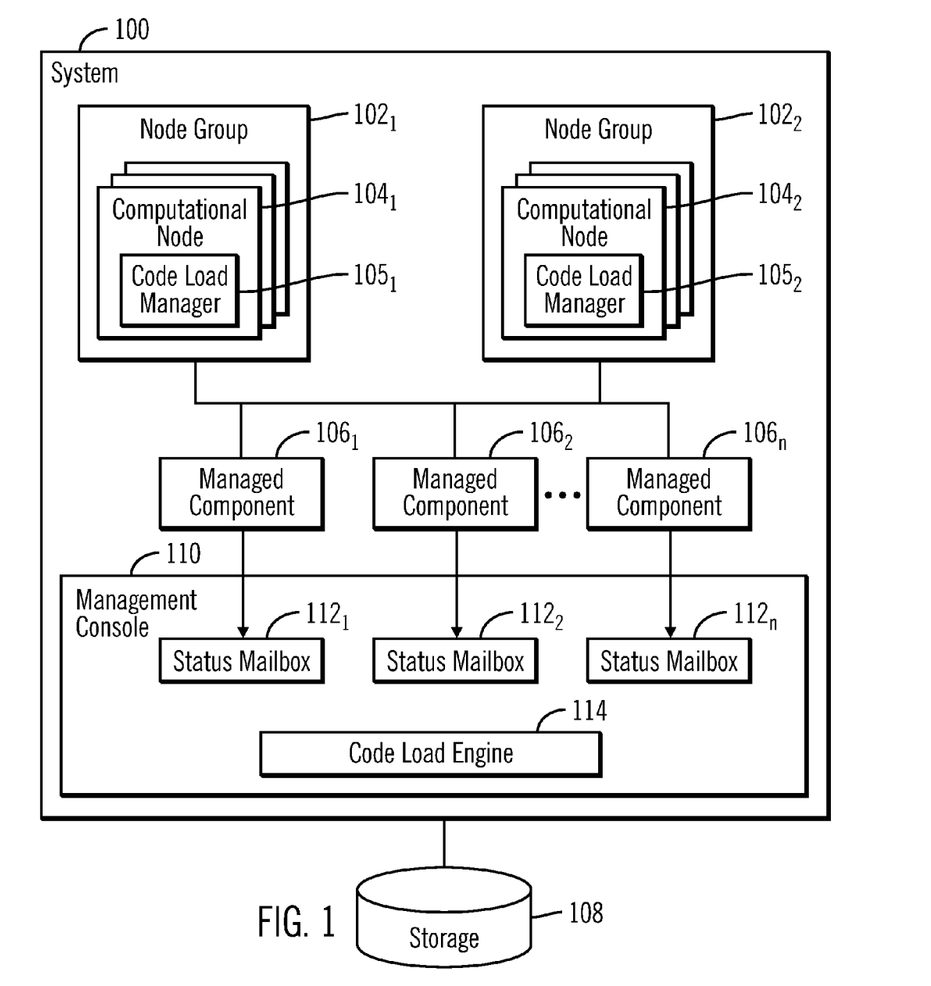
FIG. 1 illustrates an embodiment of a computing environment.

FIG. 1 illustrates an embodiment of a computing environment having a computer system 100 including at least two node groups $102_1$ and $102_2$, each including one or more computational nodes $104_1$ and $104_2$, respectively. A computational node $104_1$, $104_2$ comprises a processing element, such as a central processing unit (CPU), a core on a processor, a virtual processor, etc., which executes programs loaded into a memory. The node groups $102_1$ and $102_2$ may manage computational operations for the system 100. Managed components $106_1$, $106_2$ ... $106_n$ perform component operations to support the computational operations of the node groups $102_1$ and $102_2$. In one embodiment, the node groups $102_1$ and $102_2$ may manage Input/Output (I/O) requests directed to a storage 108, and the managed components $106_1$, $106_2$ ... $106_n$ may include, without limitation, a storage enclosure, a network adaptor, storage adaptor, a power component, etc.

A management console 110 is used to manage code load operations with respect to the node groups $102_1$ and $102_2$ and managed components $106_1$, $106_2$ ... $106_n$. A code load may comprise applying a software or firmware update to the managed components $106_1$, $106_2$ ... $106_n$. Each managed component $106_1$, $106_2$ ... $106_n$ may provide status information upon completing a code load related operation to a status mailbox $112_1$, $112_2$ ... $112_n$ maintained by the management console 110. Upon performing a code load operation, the managed components $106_1$, $106_2$ ... $106_n$ may communicate status information such as initiated, in-progress, completed, failed, etc., to their respective status mailbox $112_1$, $112_2$ ... $112_n$. The code load engine 114 includes logic to manage the node groups $102_1$ and $102_2$ to perform code load operations with respect to the managed component $106_1$, $106_2$ ... $106_n$ and to update the code and firmware within computational nodes $104_1$ and $104_2$ of the node groups $102_1$ and $102_2$.

Each of the computational nodes $104_1$, $104_2$ include a code load manager $105_1$, $105_2$ to perform code load operations to update the code and/or firmware at the managed components $106_1$, $106_2$ . . . $106_n$, and to interact with the management console 110. The computational nodes $104_1$, $104_2$ may further include an operating system and applications to perform other system operations. In embodiments, where the computational nodes $104_1$, $104_2$ perform storage controller operations, the computational nodes $104_1$, $104_2$ would include operating system or other code to perform the system operations. In alternative embodiments, the computational nodes $104_1$, $104_2$ may perform any system operations to which the system is directed, such as a database system, etc.

In FIG. 1, the management console 110 is shown as being included in the system 100. In an alternative embodiment, the management console 110 may be located on a system separate from the system 100 and communicate with the system 100 over a network or other communication line.

In FIG. 1, the status information for the managed components $106_1$, $106_2$ . . . $106_n$ is maintained in a status mailbox $112_1$, $112_2$ . . . $112_n$ dedicated to the managed component. In alternative embodiments, status information for multiple managed components may be maintained in a single status mailbox. Further, alternative data structures may be used to gather the status information on code load operations at the managed components $106_1$, $106_2$ . . . $106_n$. In this way, different node groups $102_1$, $102_2$ may access the status information on the code load progress at the managed components $106_1$, $106_2$ . . . $106_n$ because this status information is shared through the management console 110 and status information data structure $112_1$, $112_2$ . . . $112_n$.

The described architecture of FIG. 1 provides scalability because if new managed components are added to the system 100, then new status mailboxes $112_1$, $112_2$ . . . $112_n$ may be provides for these new components and the code load engine 114 and code load manager $105_1$, $105_2$ updated to provide for code load operations to be performed for the newly added managed components. Thus, adding managed components to the system does not have significant impact on the code load operations because the node groups performing code load operations can perform the code load operations for the new managed components in parallel with other code load operations.

The storage system 108 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as node groups, managed components, mailboxes, etc., are shown, there may be any number of these components.

Figure 2:
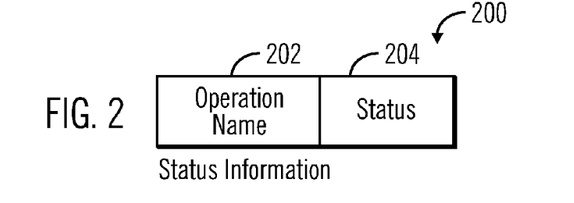
FIG. 2 illustrates an embodiment of code load status information for a managed component.

FIG. 2 illustrates an embodiment of status information 200 the managed components $106_1$, $106_2$ . . . $106_n$ generate and store in the status mailboxes $112_1$, $112_2$ . . . $112_n$. The information 200 includes an operation name 202 of the code load operation performed, such as pre-verify, code distribute, health check, and code activate. Pre-verify may comprise an operation to determine whether the managed component $106_1$, $106_2$ . . . $106_n$ needs to update its code level. Code distribute may comprise distributing the code for the code load to the managed component $106_1$, $106_2$ . . . $106_n$ to update. A health check may comprise an operation to determine whether the managed component is in a healthy operational state to receive the code load update. A code activate operation may comprise the operation that installs the distributed code on the healthy managed component $106_1$, $106_2$ . . . $106_n$.

Figure 3:
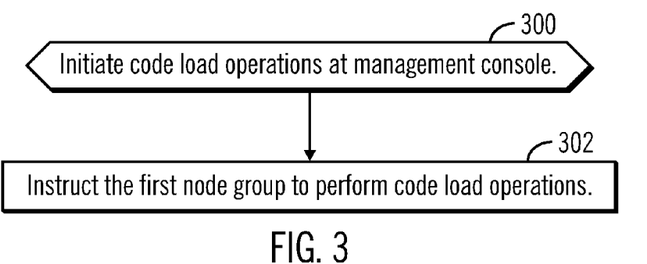
FIG. 3 illustrates an embodiment of operations to initiate code load operations.

FIG. 3 illustrates an embodiment of operations to initiate code load operations at the management console 110. Code load operations may be initiated in response to a user invoking the code load update or may automatically be performed according to a schedule. Upon initiating code load operations (at block 300), the code load engine 114 instructs (at block 302) one or more of the computational nodes $104_1$ in the first node group $102_1$ to perform code load operations 302. In response to this instruction, the code load manager $105_1$ would perform the operations in FIG. 5.

In the description, herein the initially invoked node group is referred to as a first node group $102_1$ and the subsequently invoked node group to take over code load operations from the first node group $102_1$ is referred to as a second node group $102_2$. However, either node group $102_1$, $102_2$ may function as the first node group or second node group as described herein.

Figure 4:
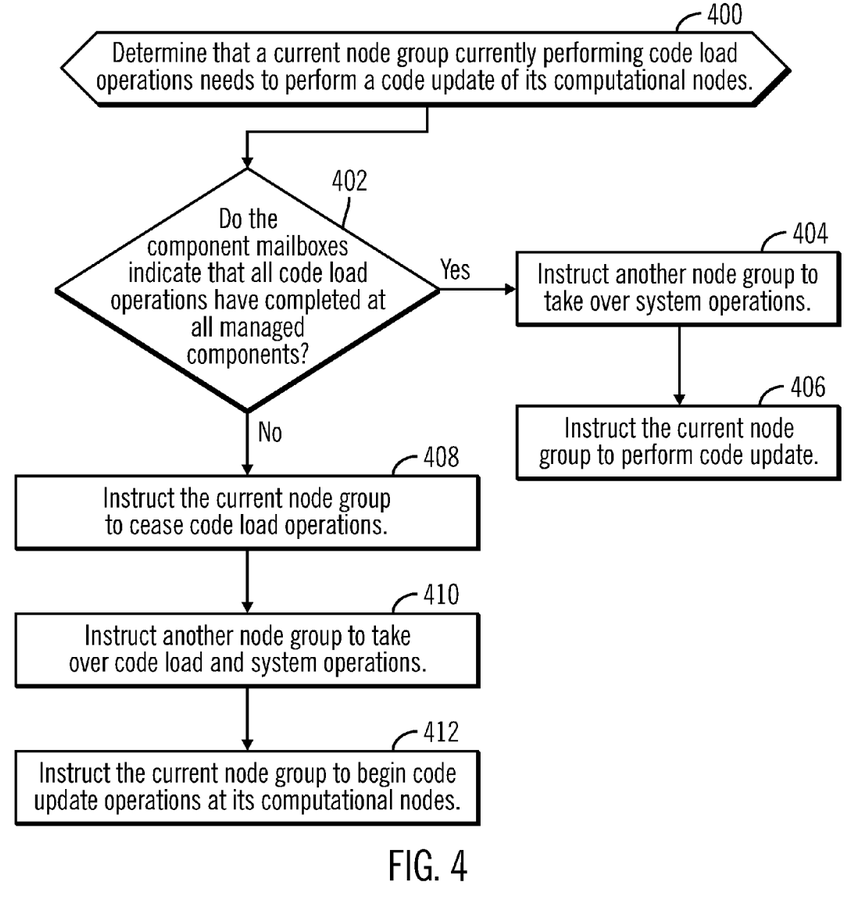
FIG. 4 illustrates an embodiment of operations to transfer code load operations from a first node group to a second node group.

FIG. 4 illustrates an embodiment of operations performed by the code load engine 114 to transfer the code load operations from the first node group $102_1$ to the second node group $102_2$, such as if the first node group $102_1$ needs to update the code and/or firmware in its computational nodes $104_1$. Upon determining (at block 400) that a current node group, e.g., $102_1$, that is performing the code load operations needs to perform a code update of its computational nodes, e.g., $104_1$, the code load engine 114 determines (at block 402) whether the component status mailboxes $112_1$, $112_2$ . . . $112_n$ indicate that all code load operations have completed at all managed components $106_1$, $106_2$ . . . $106_n$. Code operations have completed for a managed component $106_1$, $106_2$ . . . $106_n$ if the current status 204 indicates completed, failed or not started, whereas code load operations have not completed if the current status 204 in the mailbox $112_1$, $112_2$ . . . $112_n$ indicates initiated, in-progress, etc.

If (at block 402) all code load operations have completed, then the code load engine 114 instructs (at block 404) the other node group $102_2$ not currently handling code load operations to take over system 100 operations, such as storage or other operations performed at the system 100, unrelated to the code load. The current node group $102_1$ is then instructed (at block 406) to initiate its code update to update software, firmware and code at the computational nodes $104_1$.

If (at block 402) code load operations at the managed components $106_1$, $106_2$ . . . $106_n$ have not completed, then the code load engine 114 instructs (at block 408) the current node group, e.g., $102_1$, currently handling code load operations to cease code load operations and instructs (at block 410) another node group, e.g., $102_2$, not currently handling code load operations, to take over code load and system operations. The other node group $102_2$ prior to being instructed to cease code load operations may have been performing system operations at the time. Node groups perform system operations except when a node or node group has to undergo a code load. The current node group $102_1$ is then instructed (at block 412) to begin code update operations at its computational nodes. At this point, the other node group, e.g., $102_2$ that has taken over the system and code load operations becomes the current node group.

In the operations of FIG. 4, the transfer of control of the code load operations from the first node group $102_1$ to the second node group $102_2$ is performed when the code in the computational nodes $104_1$ needs to be updated. In alternative embodiments, other events may trigger the need to transfer the code load operations from the first node group $102_1$ to the second node group $102_2$, such as a failure at the first node group $102_1$, the first node group $102_1$ experiencing low resource availability and needing to shut down operations to conserve resources, or the need to direct the first node group $102_1$ toward other operations.

Figure 5:
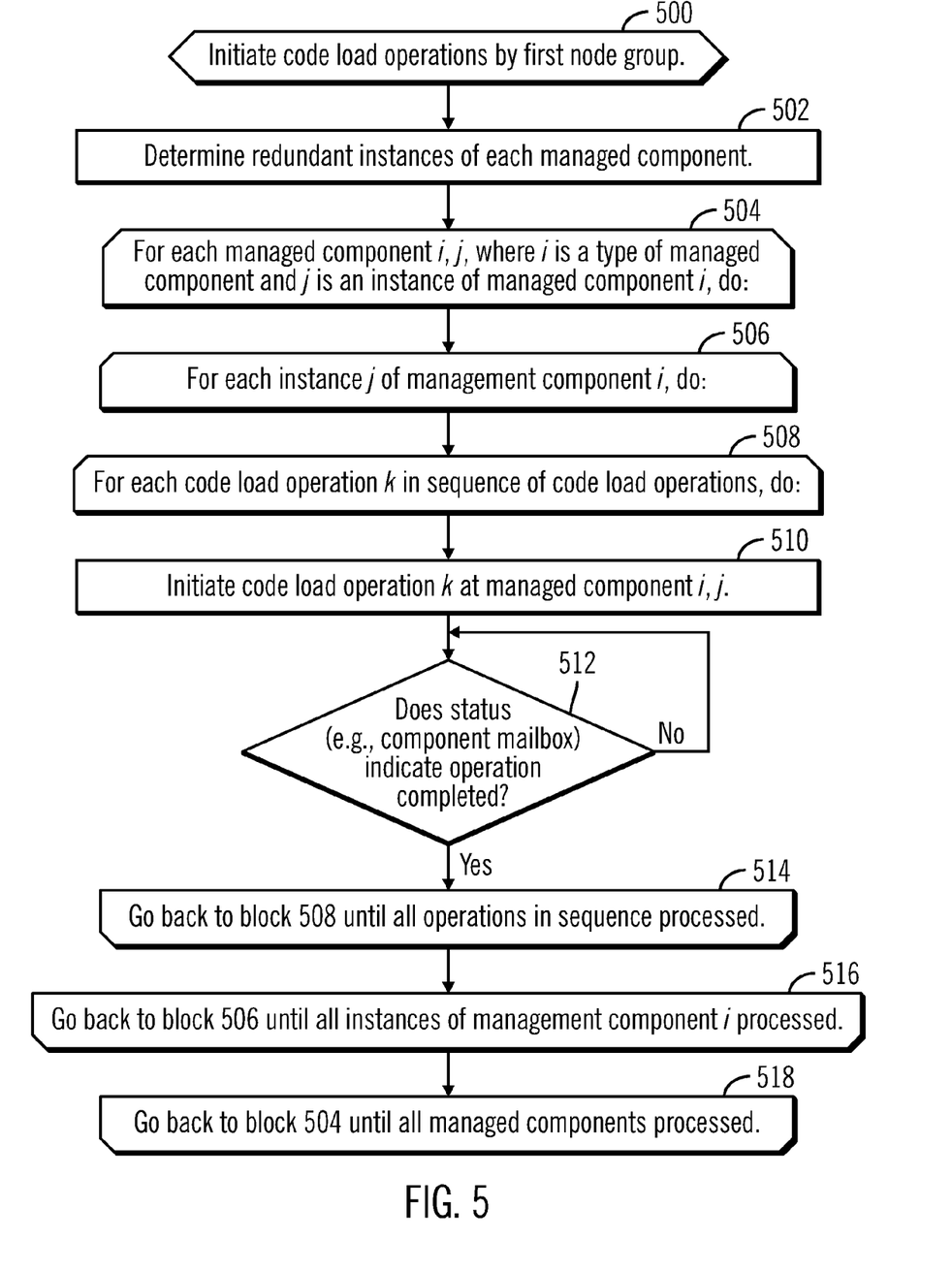
FIG. 5 illustrates an embodiment of operations for a first node group to start code load operations on the managed components.

FIG. 5 illustrates an embodiment of operations performed by the code load manager $105_1$, $105_2$ of one of the node groups $102_1$, $102_2$ invoked by the code load engine 114 to be the first node group, e.g., $102_1$, to start code load operations. Upon initiating (at block 500) code load operations, the code load manager $105_1$, determines (at block 502) redundant instances of each of the managed components $106_1$, $106_2 \ldots 106_n$. The code load manager $105_1$ may consider the managed components $106_1$, $106_2 \ldots 106_n$ in redundancy groups providing different instances of managed components $106_1$, $106_2 \ldots 106_n$ so that only one instance of managed components $106_1$, $106_2 \ldots 106_n$ is processed at a time, leaving the other redundancy group or instance of managed components $106_1$, $106_2 \ldots 106_n$ available to support system operations performed by the first node group 102. The code load manager $105_1$ performs a loop of operations at blocks 504 through 518 for each managed component i, j, where i is a type of managed component $106_1$, $106_2 \ldots 106_n$, e.g., power source, enclosure, adaptor, etc., and j is an instance of the managed component i. The code load manager $105_1$ performs an inner loop of operations at blocks 506 through 516 for each instance j of the managed component i. In this way code load operations are performed with respect to only one instance of a particular managed component i, so that another instance remains available to perform the component operations in the system 100.

For each of the processed instance of management component i, j, the code load engine $105_1$ performs a loop of operations at blocks 508 through 514 for each code load operation k in a sequence of code load operations. At block 510, the code load engine $105_1$ initiates code load operation k. If (at block 512) the most recent status 200 in the status mailbox $112_1$, $112_2 \ldots 112_n$ for the managed component i, j indicates the code load operation k, identified in status information field 202, completed, identified in status field 204, then control proceeds to process the next code load operation (k+1) in the sequence until all code load operations in the sequence are processed. If (at block 512) the most recent status 200 does not indicate that the code load operation k completed, then control loops back to block 512 to wait until the operation k completes.

The code load operations in the sequence may comprise any number of operations, such as pre-verify, code distribution, health check, activate code, etc. Upon being invoked to perform the code load operation k, the managed component i, j would send status information 200 to its status mailbox $112_1$, $112_2 \ldots 112_n$ indicating the status of processing the code lode operation k, such as initiated, in-progress, completed, failed, etc.

In the operations of FIG. 5, the first node group, e.g., $102_1$, performs the code load operation for each instance of managed component i, j, so that while code load operations are performed for say a first instance of managed component i, 1, the other instance of managed component i, 2 is performing component operations.

FIG. 5 shows one embodiment of how the logic may be performed. The managed component $106_1$, $106_2 \ldots 106_n$ may be processed in different orders of operations. Further, one or more of the computational nodes $104_1$ may in parallel perform code load operations for different managed component types, or the code load operations may be performed serially.

Figure 6:
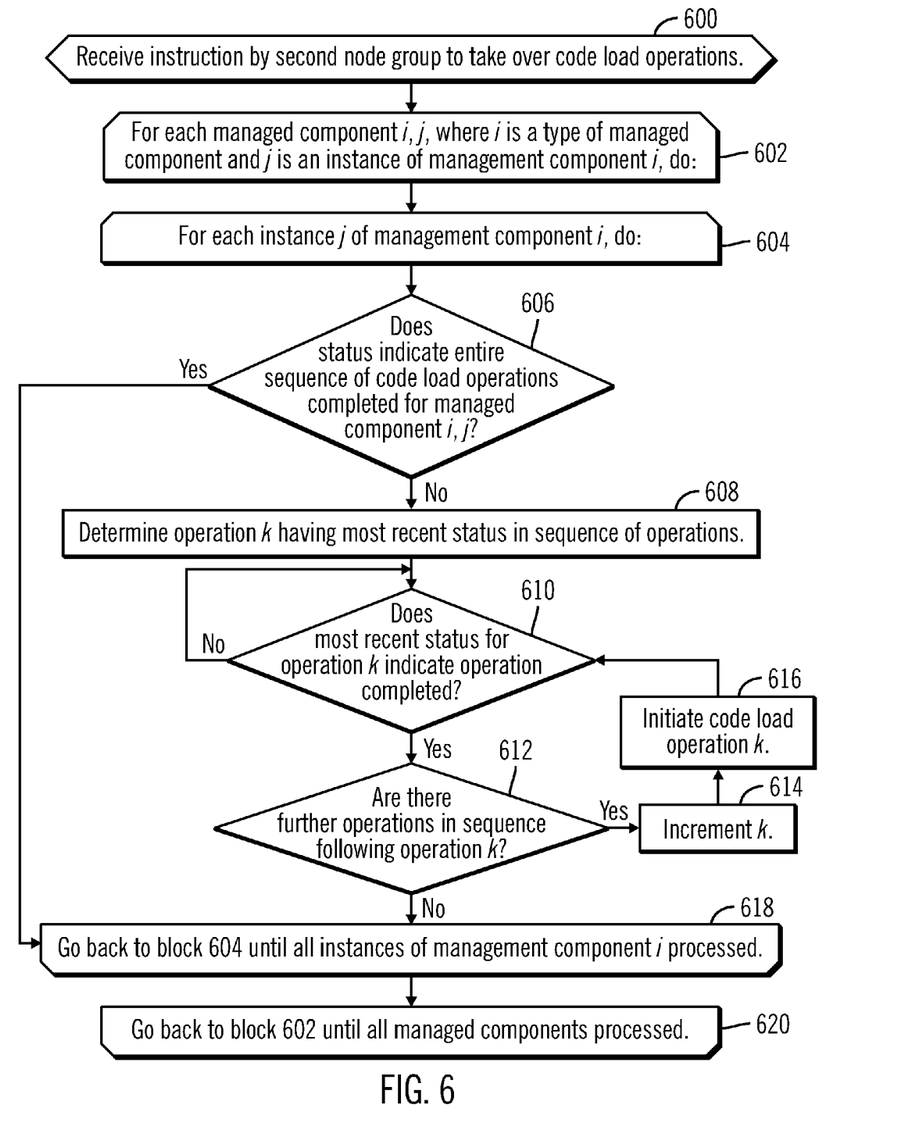
FIG. 6 illustrates an embodiment of operations to have a second node group takeover code load operations from the first node group.

FIG. 6 illustrates an embodiment of operations performed by the node group $102_2$ that takes over code load operations when the other node group $102_1$ needs to update its code. In the following example, node group $102_2$ comprises the second node group to which control of code load operations is transferred while the first node group $102_1$ relinquishes code load operations to perform a code update of its computational nodes $104_1$. Alternatively, node group $102_1$ may perform the operations of FIG. 6 to take over code load operations from node group $102_2$. Upon the second node group $102_2$ receiving (at block 600) an instruction from the code load engine 114 to take over the code load operations, the code load manager $105_2$ may perform a loop of operations at blocks 602 through 620 for each managed component i, j, where i is a type of managed component $106_1$, $106_2 \ldots 106_n$, e.g., power source, enclosure, adaptor, etc., and j is an instance of the managed component i. The code load manager $105_2$ performs an inner loop of operations at blocks 604 through 618 for each instance j of the managed component i. In this way code load operations are performed with respect to only one instance of a particular managed component i, so that another instance remains available to perform the component operations in the system 100.

For the managed component i, j, if (at block 606) the status information 200 in the status mailbox $112_1$, $112_2 \ldots 112_n$ for managed component i, j indicates that all the code load operations in the sequence were completed for managed component i, j, then the code load has completed for that managed component i, j and control can proceed (at block 618) back to block 604 for the next instance of managed component i, or if all instances have been considered for management component i, then control proceeds at block 620 to block 602 to consider the next managed component i, j. If (at block 606) the most recent status information 200 in the status mailbox $112_1$, $112_2 \ldots 112_n$ for managed component i, j indicates that not all code load operations completed, then the operation k having the most recent status in the sequence of operation is determined (at block 608), from the most recent status information 200 operation field 204. If (at block 610) the most recent status for operation k indicates the operation completed, in status field 204 and if (at block 612) there are further operations in the sequence following operation k, then k is incremented and the code load operation k of the next operation in the sequence is initiated (at block 616) at the managed component i, j. Control returns to block 610 after initiating the next code load operation in the sequence. If (at block 610) the most recent status for operation k indicates, in field 204, that the operation did not complete, then control loops back to block 610 to wait for the managed component i, j to complete the code load operation to add status information 200 for operation k indicating "completed" status. If (at block 612) there are no further operations in the sequence, then control proceeds (at block 618) to consider any further instances of the managed component i or to block 620 to consider the next managed component if there are any.

With the described operations of FIG. 6, the second node group $102_2$ looks for any managed components $106_1$, $106_2 \ldots 106_n$ that have not completed code load operations to complete the code load operations. As with the operations of FIG. 5, the second node group 102₂ taking over code load operations would only perform the operation for one instance of a managed component at a time, so that the other instance may be used to perform component operations in the system 100.

Further, if the second node group 102₂ needs to go offline for any purpose, such as perform their own code update, then the management console 110 may invoke the first node group 102₁ or another node group to perform the operations of FIG. 6 to take over code load operations. Thus, the operations of FIG. 6 may be used when any node group needs to hand off code load operations to another node group.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
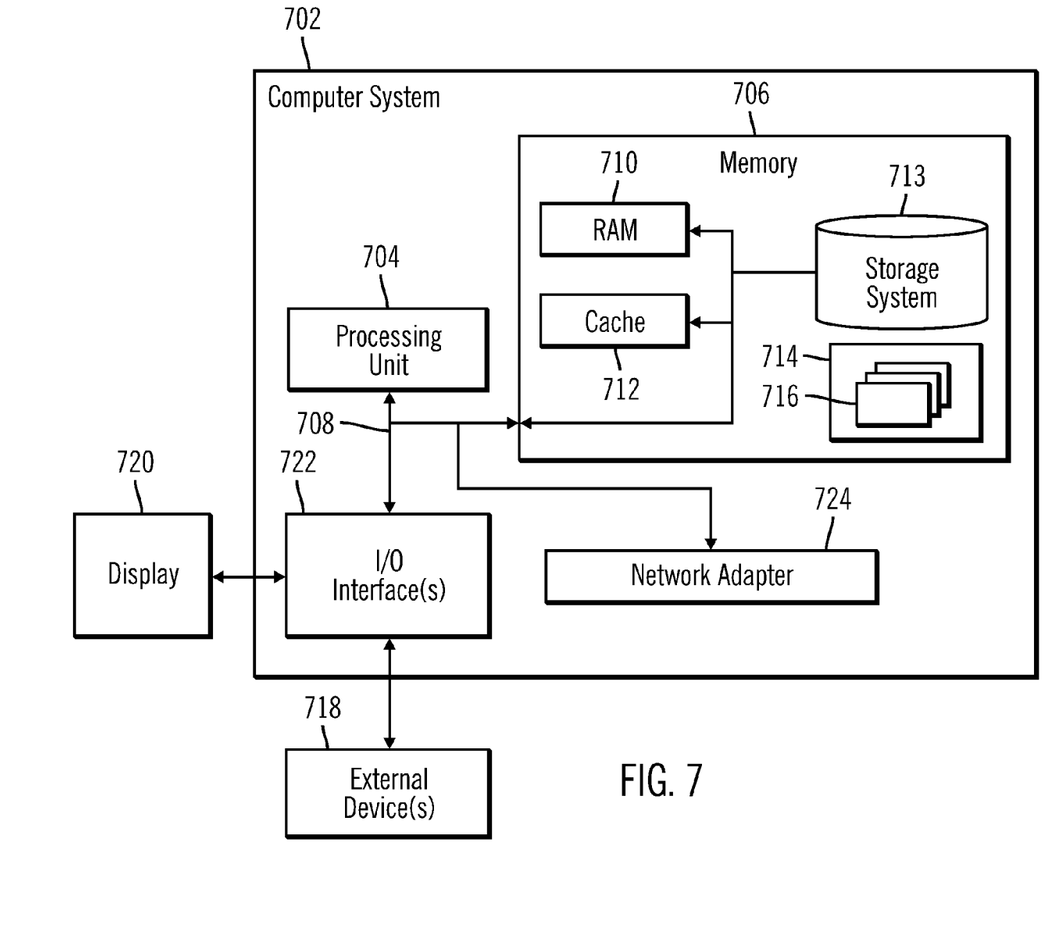
FIG. 7 illustrates an embodiment of a computing environment in which the components of FIG. 1 may be implemented.

The computational components of FIG. 1, including the computer system 100 and computational nodes $104_1$, $104_2$ may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing code load operations at managed components of a computer system, wherein the computer program product comprises a computer readable storage medium having program instructions executable by computational nodes in a first node group and a second node group to cause the first node group and the second node group to perform operations, the operations comprising:
   performing, by the first node group comprising at least one computational node in the computer system, code load operations for the managed components;
   writing status of the code load operations at the managed components to a status data structure while the code load operations are being performed at the managed component;
   transferring, by the first node group, control of the code load operations for the managed components to the second node group comprising at least one computational node in the computer system while the code load operations are occurring at the managed components; and
   reading, by the second node group, the status data structure for the managed components to determine the status of the code load operations and continue the code load operations at the managed components, wherein the second node group continues performing the code load operations with respect to at least one of the managed components at which the first node group was performing the code load operations when control of the code load operations was transferred to the second node group before the code load operations completed at the at least one of the managed components.

2. The computer program product of claim 1, wherein the status data structure comprises a message box for each of the managed components to store status information on the code load operations progress at the managed component.

3. The computer program product of claim 1, wherein the first node group transfers the control of the code load operations to the second node group in response to determining to perform a code update at the at least one computational node in the first node group.

4. The computer program product of claim 3, wherein the operations further comprise:
   in response to completing transferring control of the code load operations for the managed components from the first node group to the second node group, initiating the code update at the at least one computational node in the first node group.

5. The computer program product of claim 1, wherein there are redundant first and second instances of the managed components, wherein the first node group and the second node group perform the code load operations at the managed components by performing:
   performing the code load operations at the first instance of the managed components while the second instance of the managed components performs component operations unrelated to the code load operations; and
   in response to determining from the status data structure for the first instance of one of the managed components that the code load operations have completed at the first instance and the first instance of the managed component is available, performing the code load operations at the second instance of the managed component while the first instance of the managed component performs component operations unrelated to the code load operations.

6. The computer program product of claim 5, wherein the first and second node groups perform storage controller and Input/Output operations with respect to a storage, and wherein the managed components include redundant instances of at least one of a storage enclosure, an adaptor, and a power component, and wherein the second instance of the managed components support I/O operations to the storage while the code load operations are performed at the first instance of the managed components, and wherein the first instance of the managed components support I/O operations to the storage while the code load operations are performed at the second instance of the managed components.

7. The computer program product of claim 1, wherein the first and second node groups perform the code load operations by performing for each of the managed components:
   initiating a sequence of code load operations at the managed component, wherein the code load operations in the sequence are not performed until a previous code load operation in the sequence has completed; and
   reporting a status recorded in the status data structure for each of the code load operations indicating the operation in the sequence and a status of one of initiated, in-progress, completed, or failed.

8. The computer program product of claim 7, wherein the sequence of code load operations for at least one managed component comprises:
   pre-verifying a need of the managed component to undergo a code load update comprising computer program instructions implementing the sequence of code load operations;
   distributing to the first node group the code load update to apply to the managed component in response to pre-verifying that the managed component needs to undergo the code load update;
   performing a health check of the managed component to determine whether it is in a healthy operational state to receive the code load update in response to distributing the code load update to the first node group; and
   wherein the first node group is instructed to perform the code load update from the distributed code load update to the managed component in response to completing the health check and determining that the managed component is in the healthy operational state to receive the code load update.

9. The computer program product of claim 1, wherein a management console performs the operations of:
   instructing the first node group to perform the code load operations for the managed components;
   determining that the first node group is to update code in at least one computational node at the first node group;

instructing the first node group to cease the code load operations and begin the code load operations of the at least one computational node in the first node group; and instructing the second node group to continue the code load operations of the management components based on the status of the code load operations indicated in the status data structure.

10. A system for performing code load operations at managed components of a computer system, comprising:
a first node group comprising at least one computational node in the computer system;
a second node group comprising at least one computational node in the computer system;
a computer readable storage medium having program instructions that when executed by the computational nodes in the first node group and the second node group cause the first node group and the second node group to perform operations, the operations comprising:
performing, by the first node group, code load operations for the managed components;
writing status of the code load operations at the managed component to a status data structure while the code load operations are being performed at the managed component;
transferring, by the first node group, control of the code load operations for the managed components to the second node group while the code load operations are occurring at the managed components; and
reading, by the second node group, the status data structure for the managed components to determine the status of the code load operations and continue the code load operations at managed components, wherein the second node group continues performing the code load operations with respect to at least one of the managed components at which the first node group was performing the code load operations when control of the code load operations was transferred to the second node group before the code load operations completed at the at least one of the managed components.

11. The system of claim 10, wherein the first node group transfers the control of the code load operations to the second node group in response to determining to perform a code update at the at least one computational node in the first node group.

12. The system of claim 10, wherein there are redundant first and second instances of the managed components, wherein the first node group and the second node group perform the code load operations at the managed components by performing:
performing the code load operations at the first instance of the managed components while the second instance of the managed components performs component operations unrelated to the code load operations; and
in response to determining from the status data structure for the first instance of one of the managed components that the code load operations have completed at the first instance and the first instance of the managed component is available, performing the code load operations at the second instance of the managed component while the first instance of the managed component performs component operations unrelated to the code load operations.

13. The system of claim 12, wherein the first and second node groups perform storage controller and Input/Output operations with respect to a storage, and wherein the managed components include redundant instances of at least one of a storage enclosure, an adaptor, and a power component, and wherein the second instance of the managed components support I/O operations to the storage while the code load operations are performed at the first instance of the managed components, and wherein the first instance of the managed components support I/O operations to the storage while the code load operations are performed at the second instance of the managed components.

14. The system of claim 10, wherein the first and second node groups perform the code load operations by performing for each of the managed components:
initiating a sequence of code load operations at the managed component, wherein code load operations in the sequence are not performed until a previous code load operation in the sequence has completed; and
reporting a status recorded in the status data structure for each of the code load operations indicating the operation in the sequence of code load operations and a status of one of initiated, in-progress, completed, or failed.

15. The system of claim 14, wherein the sequence of code load operations for at least one managed component comprises:
pre-verifying a need of the managed component to undergo a code load update comprising computer program instructions implementing the sequence of code load operations;
distributing to the first node group the code load update to apply to the managed component in response to pre-verifying that the managed component needs to undergo the code load update;
performing a health check of the managed component to determine whether it is in a healthy operational state to receive the code load update in response to distributing the code load update to the first node group; and
wherein the first node group is instructed to perform the code load update from the distributed code load update to the managed component in response to completing the health check and determining that the managed component is in the healthy operational state to receive the code load update.

16. The system of claim 10, wherein a management console performs the operations of:
instructing the first node group to perform the code load operations for the managed components;
determining that the first node group is to update code in at least one computational node at the first node group;
instructing the first node group to cease code load operations and begin code update operations of the at least one computational node in the first node group; and
instructing the second node group to continue the code load operations of the management components based on the status of the code load operations indicated in the status data structure.

17. A method for performing code load operations at managed components of a computer system, comprising:
performing, by a first node group comprising at least one computational node in the computer system, code load operations for the managed components;
writing status of the code load operations at the managed component to a status data structure while the code load operations are being performed at the managed component;
transferring, by the first node group, control of the code load operations for the managed components to a second node group comprising at least one computational node in the computer system while the code load operations are occurring at the managed components; and reading, by the second node group, the status data structure for the managed components to determine the status of the code load operations and continue the code load operations at managed components, wherein the second node group continues performing the code load operations with respect to at least one of the managed components at which the first node group was performing the code load operations when control of the code load operations was transferred to the second node group before the code load operations completed at the at least one of the managed components.

18. The method of claim 17, wherein the first node group transfers the control of the code load operations to the second node group in response to determining to perform a code update at the at least one computational node in the first node group.

19. The method of claim 17, wherein there are redundant first and second instances of the managed components, wherein the first node group and the second node group perform the code load operations at the managed components by performing:

performing the code load operations at the first instance of the managed components while the second instance of the managed components performs component operations unrelated to the code load operations; and in response to determining from the status data structure for the first instance of one of the managed components that the code load operations have completed at the first instance and the first instance of the managed component is available, performing the code load operations at the second instance of the managed component while the first instance of the managed component performs component operations unrelated to the code load operations.

20. The method of claim 19, wherein the first and second node groups perform storage controller and Input/Output operations with respect to a storage, and wherein the managed components include redundant instances of at least one of a storage enclosure, an adaptor, and a power component, and wherein the second instance of the managed components support I/O operations to the storage while the code load operations are performed at the first instance of the managed components, and wherein the first instance of the managed components support I/O operations to the storage while the code load operations are performed at the second instance of the managed components.

21. The method of claim 17, wherein the first and second node groups perform the code load operations by performing for each of the managed components:

initiating a sequence of code load operations at the managed component, wherein code load operations in the sequence are not performed until a previous code load operation in the sequence has completed; and reporting a status recorded in the status data structure for each of the code load operations indicating the operation in the sequence and a status of one of initiated, in-progress, completed, or failed.

22. The method of claim 21, wherein the sequence of code load operations for at least one managed component comprises:

pre-verifying a need of the managed component to undergo a code load update comprising computer program instructions implementing the sequence of code load operations;

distributing to the first node group the code load update to apply to the managed component in response to pre-verifying that the managed component needs to undergo the code load update;

performing a health check of the managed component to determine whether it is in a healthy operational state to receive the code load update in response to distributing the code load update to the first node group; and wherein the first node group is instructed to perform the code load update from the distributed code load update to the managed component in response to completing the health check and determining that the managed component is in the healthy operational state to receive the code load update.

23. The method of claim 17, wherein a management console performs the operations of:

instructing the first node group to perform the code load operations for the managed components;

determining that the first node group is to update the code in at least one computational node at the first node group;

instructing the first node group to cease code load operations and begin code update operations of the at least one computational node in the first node group; and instructing the second node group to continue the code load operations of the management components based on the status of the code load operations indicated in the status data structure.

* * * * *